(12) United States Patent
Gevorgian

(10) Patent No.: US 7,861,749 B2
(45) Date of Patent: Jan. 4, 2011

(54) DISPENSER

(76) Inventor: Artin Gevorgian, 2625 W. Alameda Ave., Suite 314, Burbank, CA (US) 91505-4822

( * ) Notice: Subject to any disclaimer, the term of this patent is extended or adjusted under 35 U.S.C. 154(b) by 872 days.

(21) Appl. No.: 11/725,109

(22) Filed: Mar. 14, 2007

(65) Prior Publication Data

US 2008/0223877 A1    Sep. 18, 2008

(51) Int. Cl.
B67C 3/26 (2006.01)
B67D 7/06 (2010.01)

(52) U.S. Cl. ........... 141/270; 141/258; 141/264; 141/267; 141/268; 222/38; 222/185.1; 222/440

(58) Field of Classification Search ............ 141/175, 141/258, 264, 267, 268, 270, 363–366; 222/38, 222/185.1, 286, 440, 448
See application file for complete search history.

(56) References Cited

U.S. PATENT DOCUMENTS

| | | | | |
|---|---|---|---|---|
| 1,313,174 A | * | 8/1919 | Eisenhardt | 222/365 |
| 1,487,683 A | * | 3/1924 | Marsh | 141/262 |
| 1,547,953 A | * | 7/1925 | Palmer | 222/510 |
| 1,557,273 A | * | 10/1925 | Secrist | 141/284 |
| 2,269,432 A | * | 1/1942 | Beck et al. | 177/113 |
| 2,708,536 A | * | 5/1955 | Knoff | 222/510 |
| 2,852,170 A | * | 9/1958 | Reynolds | 222/439 |
| 3,101,159 A | * | 8/1963 | Fletcher | 222/644 |
| 4,505,407 A | * | 3/1985 | Johnson | 222/181.1 |
| 5,019,250 A | * | 5/1991 | Lorenzen | 210/85 |
| 5,259,537 A | | 11/1993 | Beers et al. | |
| 5,386,930 A | * | 2/1995 | Shani | 222/185.1 |
| 5,437,396 A | * | 8/1995 | Russillo et al. | 222/185.1 |
| 5,490,615 A | | 2/1996 | Robbins et al. | |
| 5,908,144 A | * | 6/1999 | Dalton | 222/185.1 |
| 6,145,705 A | * | 11/2000 | Wallace et al. | 222/162 |
| 7,770,529 B2 | * | 8/2010 | Phillips, Jr. | 111/7.3 |

* cited by examiner

Primary Examiner—Timothy L Maust

(57) ABSTRACT

A dispenser for dispensing metered amounts of powdered material, such as baby formula, from a dispenser unit, or cartridge, that can be quickly and easily interconnected with the dispenser. The dispenser can accommodate formula bottles of various sizes and includes a dispensing plunger that provides an oscillating action to prevent compaction of the formula and functions to ensure even dispensing of the formula into the formula bottle. Uniquely, actuation of the dispensing plunger creates a negative pressure internally of the dispensing chamber of the dispenser so as to assist the uniform withdrawal of formula from the cartridge.

20 Claims, 10 Drawing Sheets

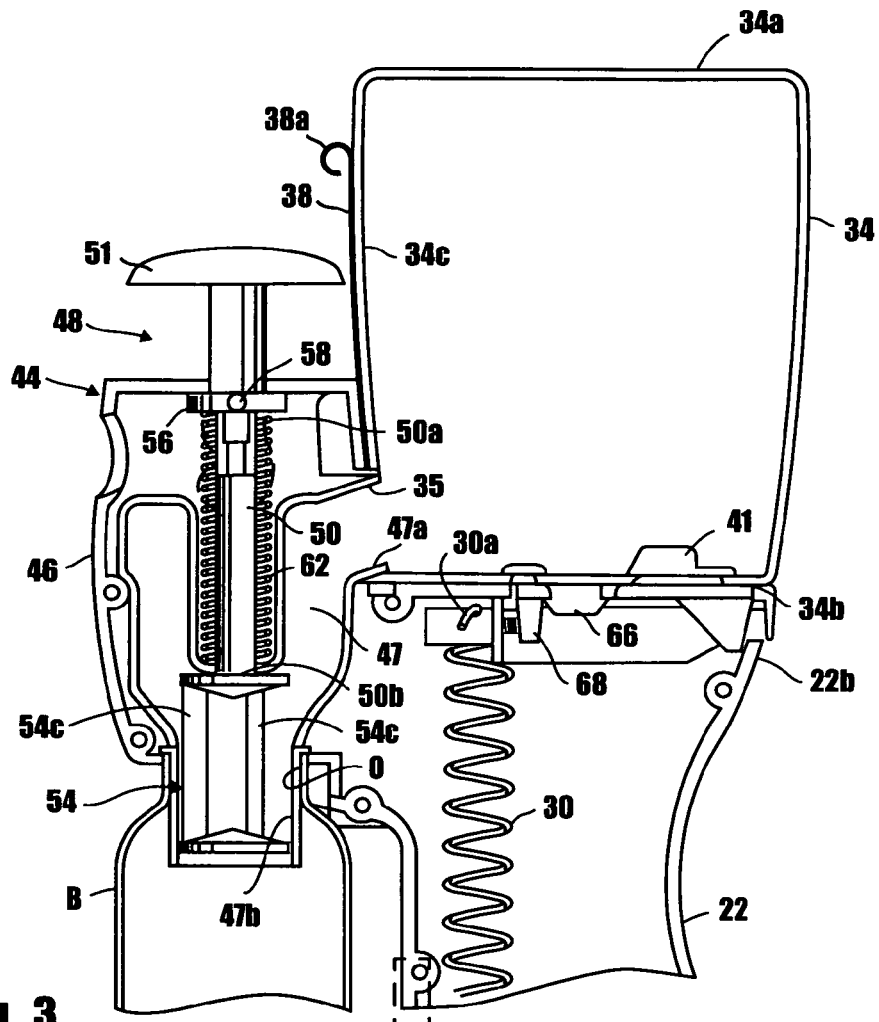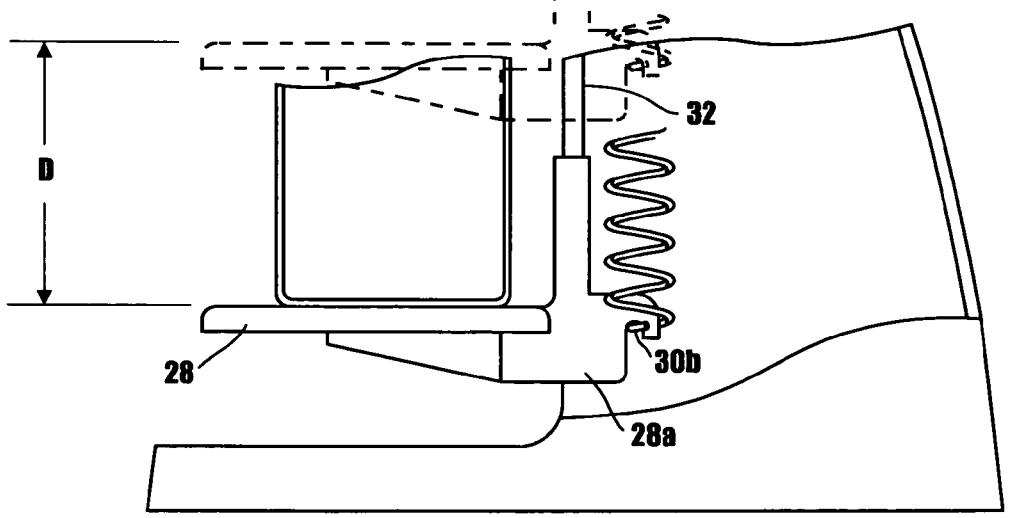
Fig. 3

DISPENSER

BACKGROUND OF THE INVENTION

1. Field of the Invention

The present invention relates generally to substance dispensers. More particularly, the invention concerns an apparatus for dispensing metered amounts of powered material, such as infant formula, nutritional supplements and the like.

2. Discussion of the Prior Art

A wide variety of dispensers for dispensing a number of different kinds of substances have been suggested in the past. More particularly, the prior art substance dispensers include dispensers for dispensing metered amounts of particulate materials, including granular and powdered materials such as condiments, powdered flavor concentrate, chemical reagents and nutritional supplements.

By way of example, U.S. Pat. No. 5,437,396 issued to Russillo, et al., discloses a dispenser apparatus for dispensing various types of condiments including salt, pepper, tea, coffee, spices, garlic and sugar. Similarly, U.S. Pat. No. 5,259,537 issued to Beers, et al., concerns a single dosage substance dispenser for dispensing powdered chemical reagents used in photometric analysis. The Beers, et al., dispenser includes a housing having a chamber formed therein for holding the substance to be dispensed and a discharge port that communicates with the chamber. A plunger is slidably mounted to the housing for extending through the chamber and into the discharge port. A spring is provided for urging the plunger to retract so that the seal portion of the plunger engages the discharge port and a receptacle portion is maintained in the chamber to collect the single dosage therefrom.

The patent to Robbins, et al., U.S. Pat. No. 5,490,615, concerns a condiment dispenser with variable quality control. The Robbins dispenser has the plunger which is pressed downwardly by the user to dispense condiments such as salt, pepper, sugar, spices, etc. An adjusting device can be set to determine a predetermined amount be dispensed by each stroke of the plunger.

As will be discussed more fully in the paragraphs which follow, the dispenser of the present invention, while usable to dispense a wide variety of materials, is especially well suited for dispensing precisely measured amounts of baby formula with each stroke of the plunger of the device.

A number of different types of infant formulas are readily commercially available in the United States and throughout the world. Because it is generally less expensive, infant formula in powdered form has become quite popular in recent years. Feeding with infant formula is practiced for a number of reasons, including the inability of the mother to produce sufficient breast milk, situations where the mother is taking medication that may adversely affect the quality of her breast milk and when the mother simply chooses not to breast-feed.

Powdered infant formula is generally sold in bulk and when used is typically removed from the bulk container in measured amounts and then mixed with specified amounts of water. The exact proportions specified on the product label must be used. Under-diluted formula can result in problems with the infant's digestive system and over-diluted formula will not provide adequate nutrition for the infant. It is this problem, among others, that the apparatus of the present invention seeks to overcome by providing an easy-to-use, highly reliable dispensing apparatus that automatically dispenses into the baby bottle precise quantities of infant formula.

The unique design of the dispenser of the present invention permits the user to load into the apparatus baby bottles of various sizes and then to accurately dispense formula into the baby bottle without spillage. The plunger of the device, which can be operated with one hand if necessary, has an oscillating action that mitigates against compaction of the formula and prevents uneven dispensing of formula. Further, the plunger action builds negative pressure internally of the dispensing chamber during the down stroke to assist with the evacuation of formula from the dispensing cartridge of the device. As the internal volume in the dispensing chamber increases during the plunger down stroke, the resulting lowered internal pressure helps to uniformly draw formula from the dispensing cartridge.

SUMMARY OF THE INVENTION

It is an object of the present invention to provide a dispenser for dispensing metered amounts various types of materials, including baby formula, that is compact, is easy-to-use and is of an attractive design.

Another object of the invention is to provide a dispenser of the aforementioned character which can accommodate formula bottles of various sizes and in such a manner as to ensure that the formula bottle is directly integrated with the dispenser outlet so as to avoid spillage.

Another object of the invention is to provide a dispenser as described in the preceding paragraphs that includes a dispensing plunger that can be operated with one hand if necessary and provides an oscillating action to prevent compaction of the formula and to ensure even dispensing of the formula into the formula bottle.

Another object of the invention is to provide a substance dispenser that dispenses powdered material, such as baby formula, from a pre-filled dispenser unit, or cartridge, that can be quickly and easily interconnected with the dispenser.

Another object of the invention is to provide a substance dispenser of the character described in the preceding paragraph in which the dispenser unit is sealably interconnected with the dispenser in a manner to effectively preclude contamination of the formula contained within the cartridge.

Another object of the invention is to provide a dispenser of the character described in which the action of the dispensing plunger creates a negative pressure internally of the dispensing chamber of the dispenser so as to assist in the uniform withdrawal of formula from the pre-filled cartridge.

Another object of the invention is to provide a dispenser as described in the preceding paragraphs in which a single, measured portion of powdered formula is dispensed each time the dispensing plunger is actuated.

Another object of the invention is to provide a dispenser that dispenses powdered material, such as baby formula, from a dispenser unit or cartridge having an inlet opening that permits formula to be added to the dispenser unit as may be necessary.

Another object of the invention is to provide a dispenser of the type described in which the parts can be easily assembled and disassembled for ease of washing.

The foregoing and other objects of the invention are realized by the dispenser apparatus of the invention as more fully described in the paragraphs which follow.

BRIEF DESCRIPTION OF THE DRAWINGS

FIG. 3 is a greatly enlarged, foreshortened, cross-sectional view of the dispenser apparatus shown in FIGS. 1 and 2.

FIG. 10 is a generally perspective view of an alternate form of material containing cartridge of the invention.

DESCRIPTION OF THE INVENTION

Figure 1:
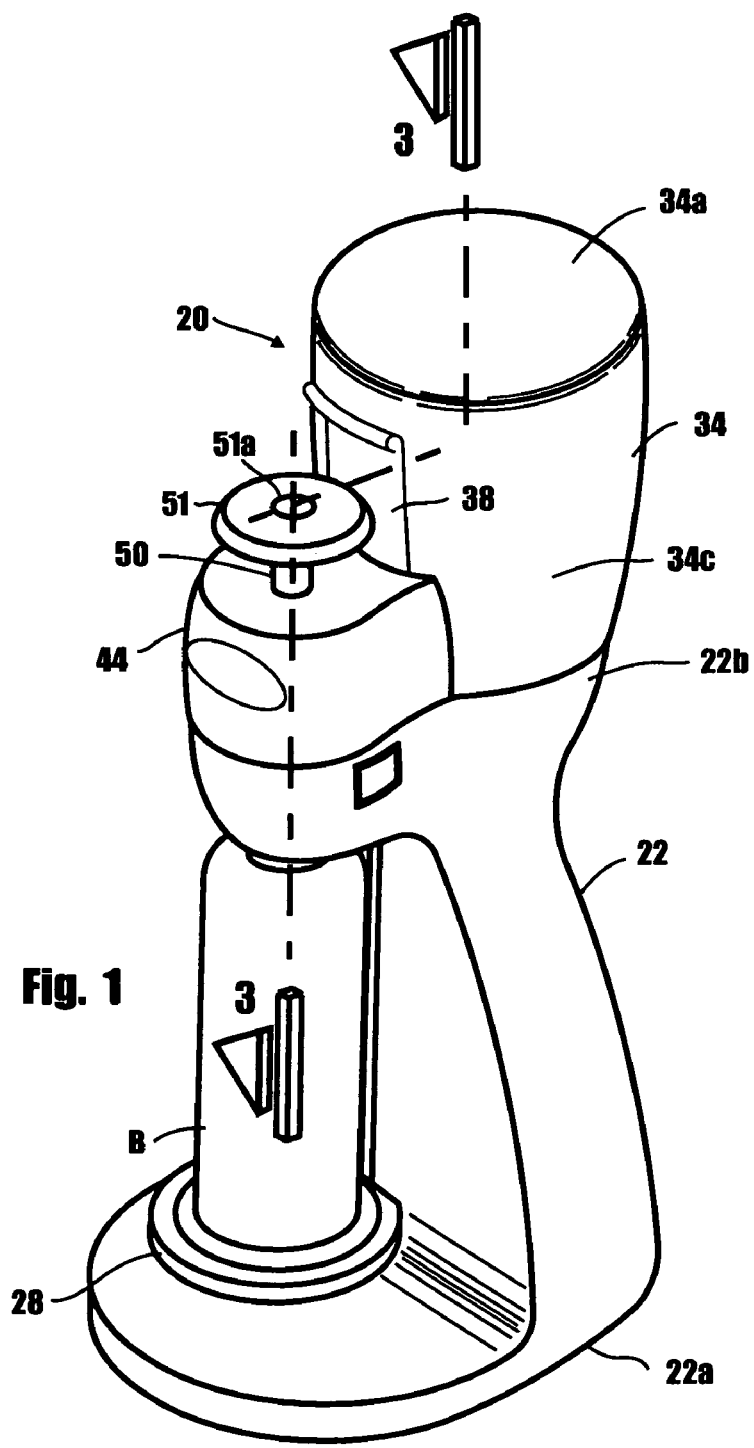
FIG. 1 is a generally perspective view of one form of the dispenser apparatus of the invention.
Figure 2:
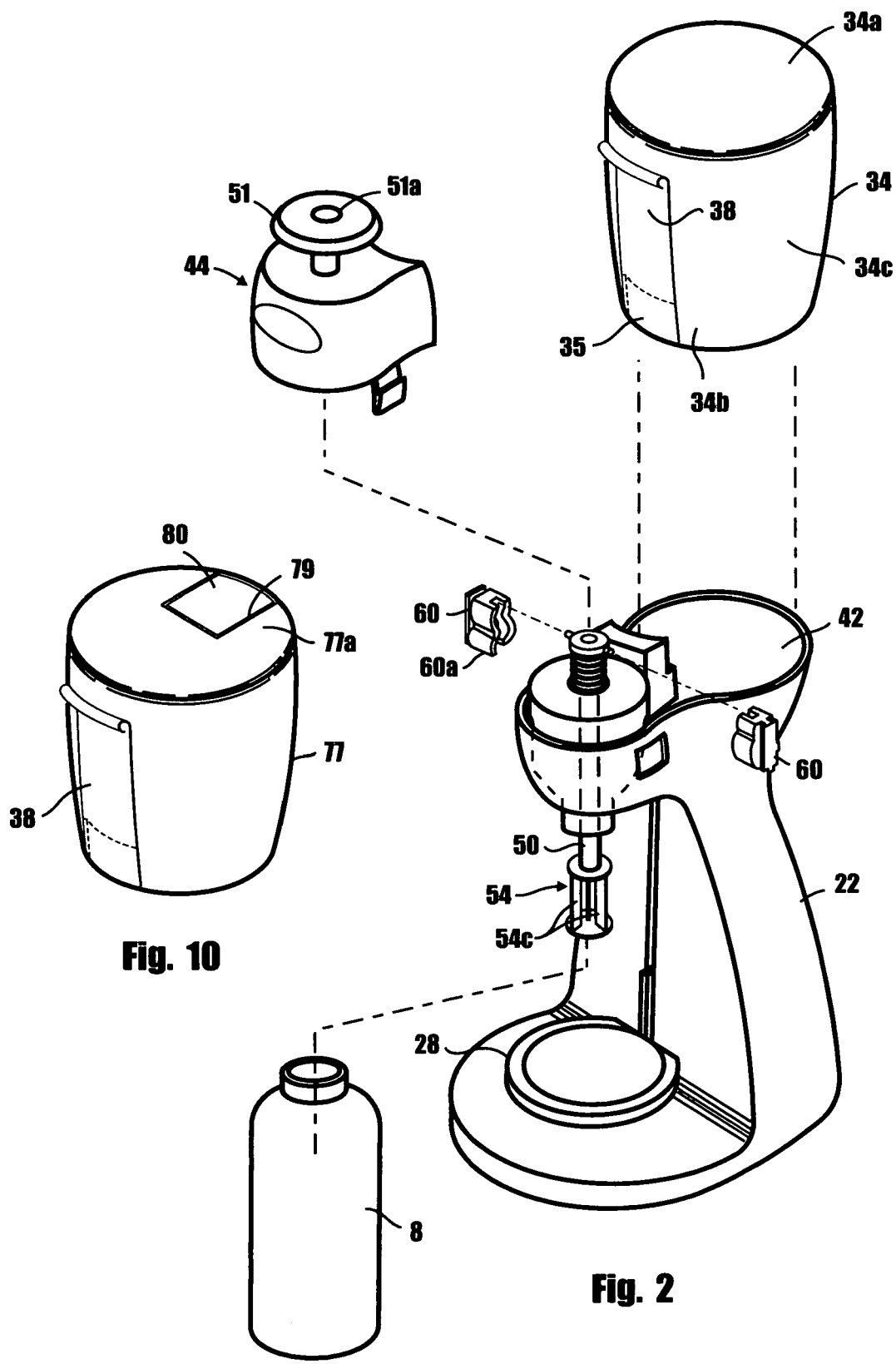
FIG. 2 is a generally perspective, exploded view of the apparatus shown in FIG. 1.
Figure 4:
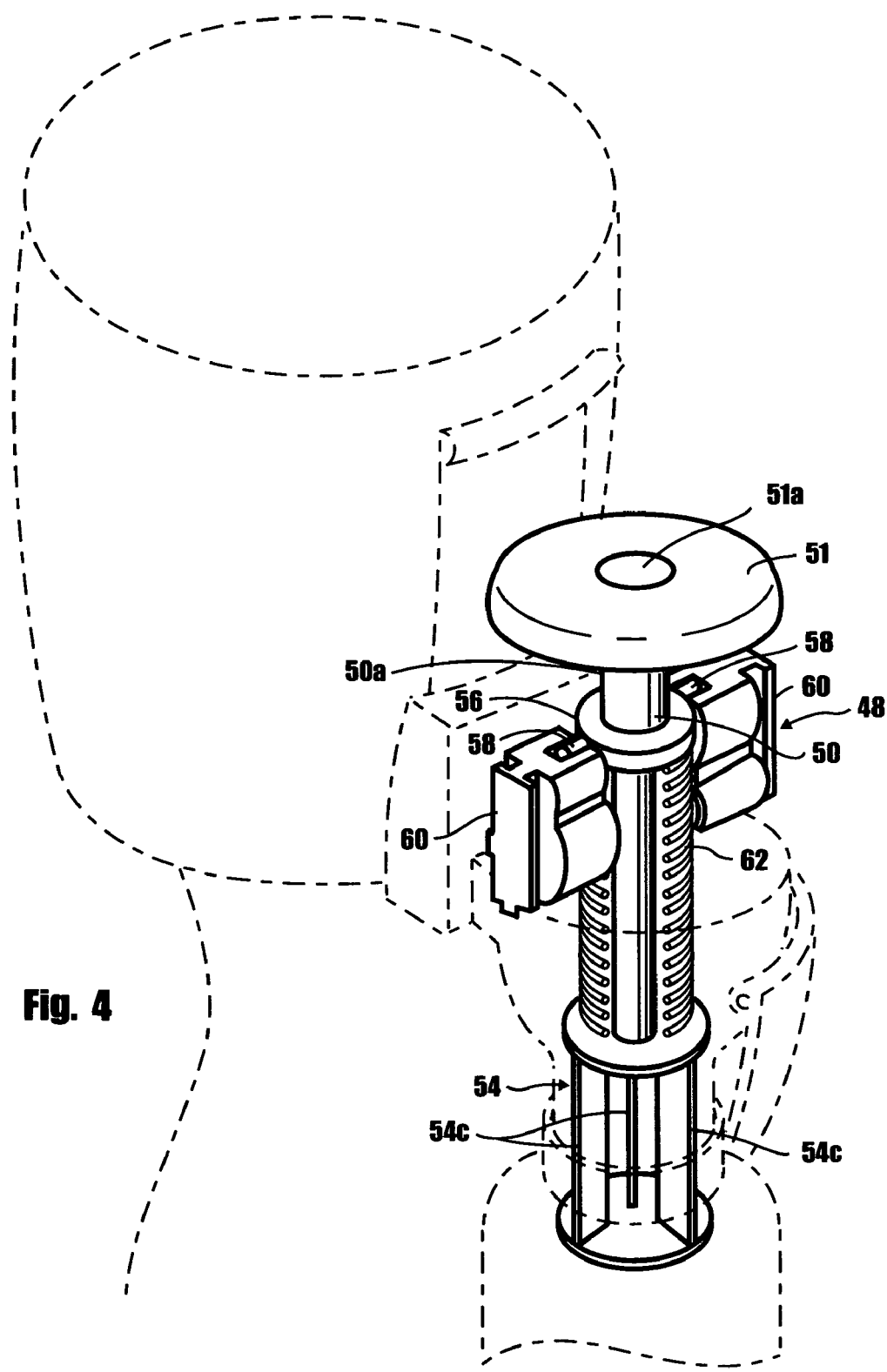
FIG. 4 is a greatly enlarged, generally perspective view of the plunger sub-assembly of the apparatus of the invention.

Referring to the drawings and particularly to FIGS. 1 and 2, one form of the dispenser apparatus of the present invention for dispensing powered material into container, such as a formula bottle "B" is there shown and generally designated by the 20. The dispenser apparatus here comprises a housing 22 having a base portion 22a and an upper portion 22b. Upper portion 22b includes a closure wall 24 having a pair of spaced-apart, upwardly extending indexing protuberances 26, the purpose of which will presently be described (see also FIG. 6).

As best seen by referring to FIG. 3, a container support base 28 is connected to housing 22 for supporting the container, or formula bottle "B". The support base is movable through a distance "D" between a first position shown by the dotted lines in FIG. 3 and a second position shown by the solid lines in FIG. 3. Biasing means, shown here as a coil spring 30 that is housed internally of housing 22, functions to continuously urge the container support base 28 toward the first position shown by the dotted lines in FIG. 3. In the present form of the invention, the upper end 30a of the spring is interconnected with the upper portion 22b of the housing and the lower end 30b of the spring is interconnected with the connector portion 28a of support base 28. In operation, the support base moves telescopically along a guide rod 32 that is housed within the housing 22. With the construction thus described, formula bottles of various sizes can readily be operably interconnected with the dispenser in the manner indicated in FIGS. 1, 2 and 3 of the drawings.

Removably connected to the upper portion 22b of housing 22 in the manner best seen in FIG. 3 of the drawings is a powdered material containing cartridge 34. In the preferred form of the invention, cartridge 34 comprises a top wall 34a, a bottom wall 34b and a side wall 34c having an outlet 35 (FIG. 3). A sealing tab 38 is slidably connected to side wall 34c for movement between a first outlet closure position and the second outlet open position shown in FIG. 3 of the drawings.

Figure 6:
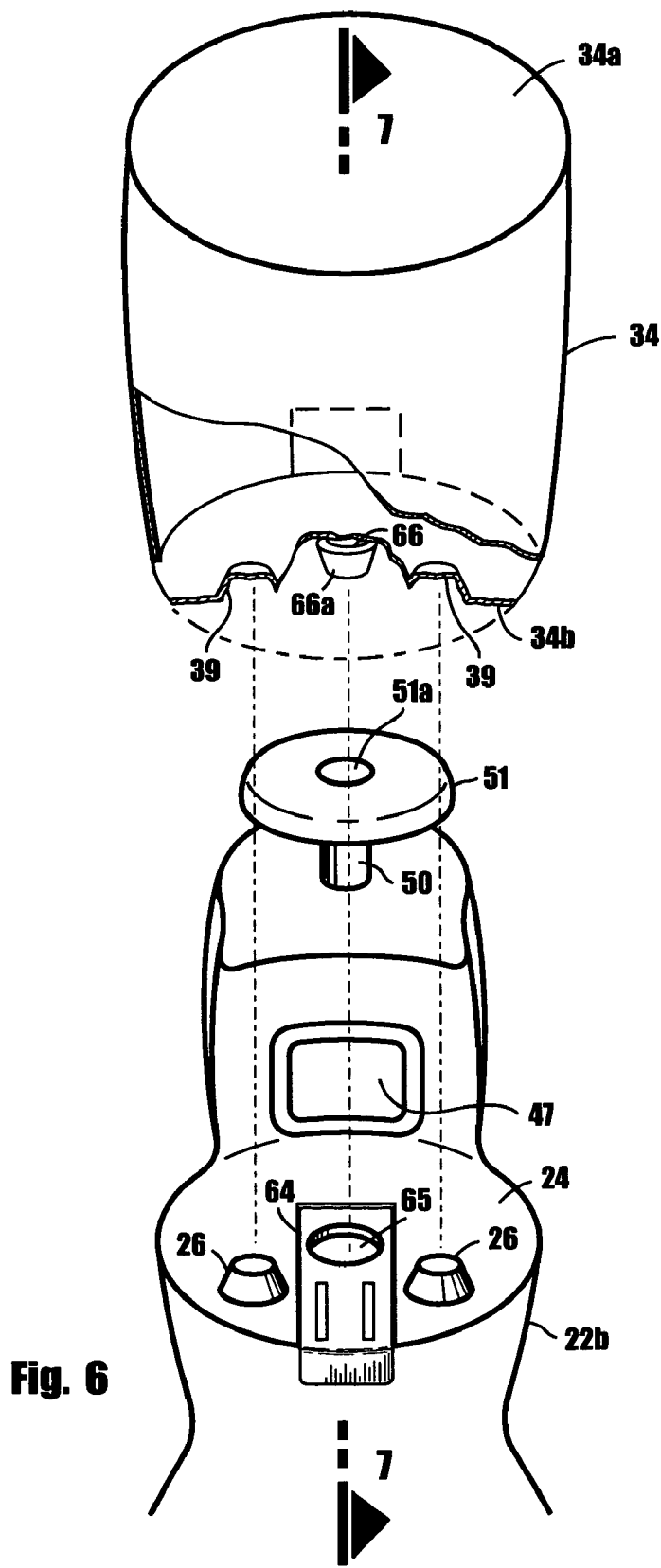
FIG. 6 is a generally perspective, exploded view of the upper portion of the dispenser apparatus illustrating the method of interconnection of the material containing cartridge with the upper body of the dispenser apparatus.

As indicated in FIG. 6, bottom wall 34b is provided with a pair of spaced-apart recesses 39 that are constructed and arranged to receive the previously identified indexing protuberances 26. The protuberances 26 in cooperation with recesses 39, function to correctly position the formula cartridges 34 relative to housing 22 so that the outlet 35 of the cartridges is indexedly aligned with the inlet of the novel material dispensing assembly 44 of the invention, the character of which will presently be described. Cartridge 34 is designed for distribution in pre-packaged units, such as "six packs". In accordance with this concept, the user, rather than scooping formula out of a large container, purchases a pre-packaged number of cartridges that are individually much easier to handle and uniquely avoid spilling of formula when introducing the formula into the formula bottle. In practice, the pre-packaged cartridges can, by appropriate branding techniques, be associated with the specific company that produces the formula.

Referring particularly to FIGS. 3 and 4 through 5A, the important powdered material dispensing assembly 44 here comprises a dispensing housing 46 having a powdered material chamber 47 having an inlet 47a that is in communication with cartridge outlet 35.

As best seen in FIG. 3, powdered material chamber has an outlet 47b that is in communication with the inlet "O" of the formula bottle "B".

Forming a highly novel feature of the apparatus of the present invention is a material dispensing plunger sub-assembly, which is generally designated in the drawings by the numeral 48. Plunger sub-assembly 48, which is interconnected with the dispensing housing 46 in the manner indicated in FIG. 3 of the drawings, comprises an elongated shaft 50 having an upper portion 50a and a lower portion 50b. By pushing downwardly on the finger engaging head portion 51, shaft 50 can be moved within the powdered material holding chamber 48 from the first position shown in FIG. 1 to the second position shown by the solid lines in FIG. 5A.

Affixed proximate the lower portion 50b of the shaft 50 is a uniquely configured, powdered material dispensing component 54. In a manner presently to be described material dispensing component 54 functions to accurately dispense metered amounts of powdered material from powdered material chamber 47 into the formula bottle "B".

Forming another highly novel feature of the present invention is oscillating means for oscillating the powdered material contained within powdered material chamber 47 as the material is dispensed into the formula bottle. This novel oscillating means functions to agitate the powdered material contained within chamber 47 and to release the powdered material from the chamber in an evenly distributed circular pattern into the formula bottle.

Figures 5, 5B:
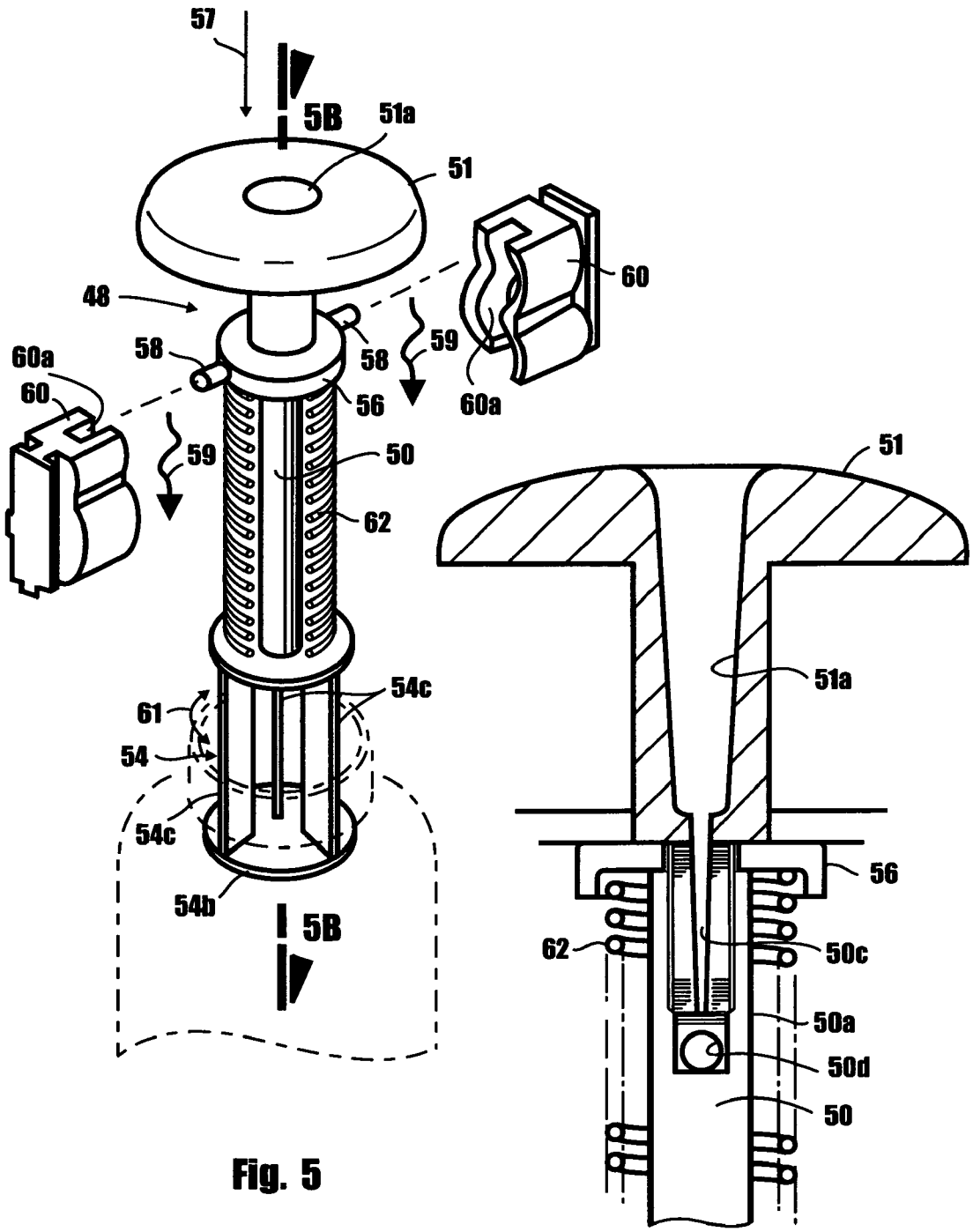
FIG. 5 is an exploded, generally perspective, diagrammatic view, similar to FIG. 4, illustrating the operation of the plunger sub-assembly.
FIG. 5B is an enlarged, cross-sectional view taken along lines 5B-5B of FIG. 5.
Figure 5A:
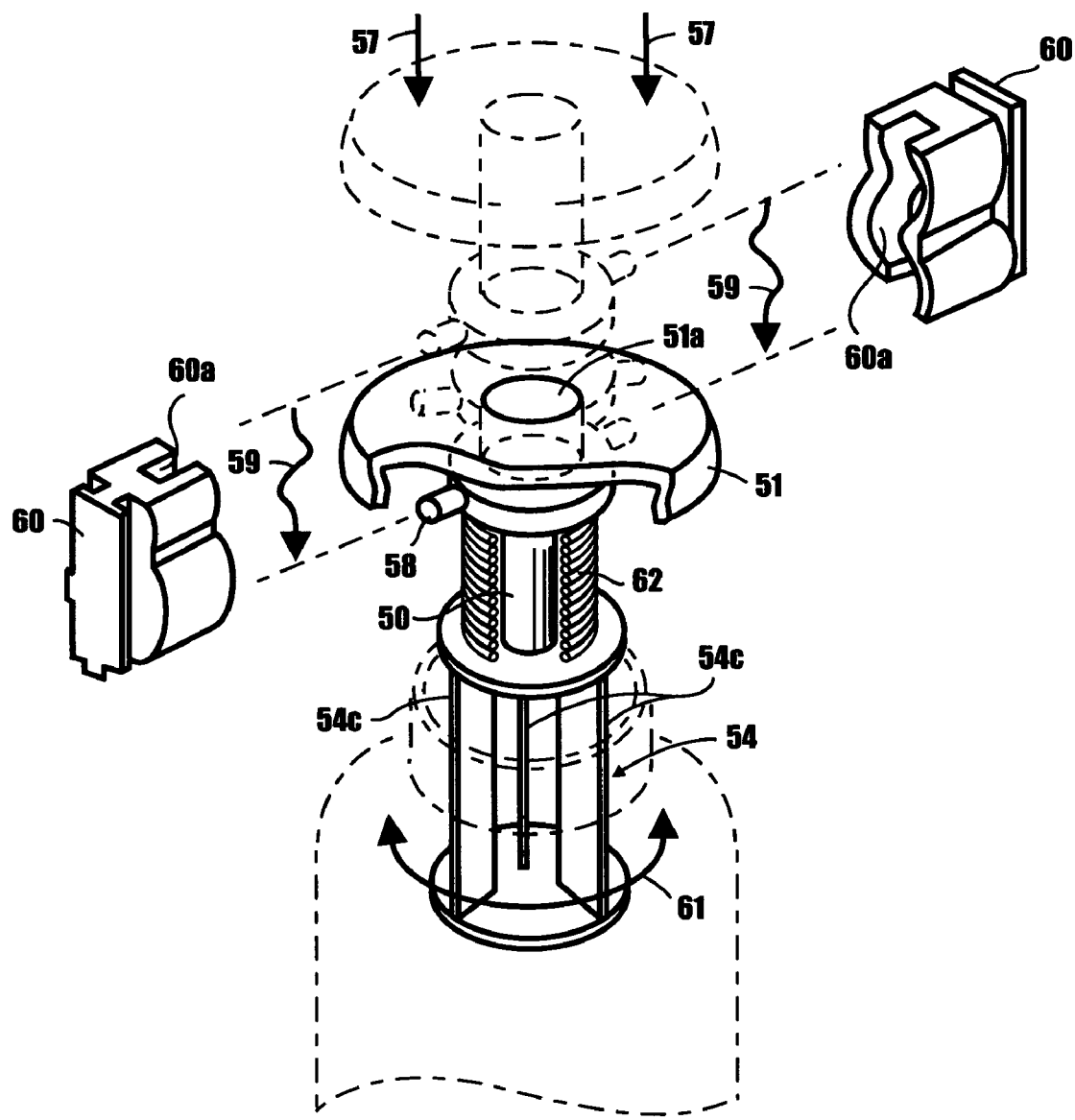
FIG. 5A is an exploded, generally perspective view, similar to FIGS. 4 and 5, but showing the plunger sub-assembly in a material dispensing position.

Referring particularly to FIGS. 1, 4, 5 and 5A, this important oscillating means here comprises, in addition to shaft 50 and material dispensing component 54, a collar 56 that is affixed to elongated shaft 50 proximate the upper portion 50a thereof. As best seen in FIGS. 5 and 5A, collar 56 is provided with a pair of oppositely disposed guide pins 58 that extend outwardly therefrom. Guide pins 58 are closely received within generally serpentine-shaped guide channels 60a formed in a pair of oppositely disposed guide members 60 that are connected to housing 22 proximate the upper portion thereof. For a purpose presently to be described, a coil spring 62 circumscribes the intermediate portion of elongated shaft 50 so that the coil spring is disposed between collar 56 and the powdered material dispensing component 54. With this construction, as the shaft 50 is pushed downwardly in the direction of the arrow 57 of FIG. 5 against the urging of the coil spring 62, the guide pins 56 will travel along the serpentine guide channels 60a thereby causing an oscillating, generally circular-shaped motion to be imparted to the powdered material dispensing component 54 as indicated by the arrows 59 and 61 of FIGS. 5 and 5A.

Figure 7:
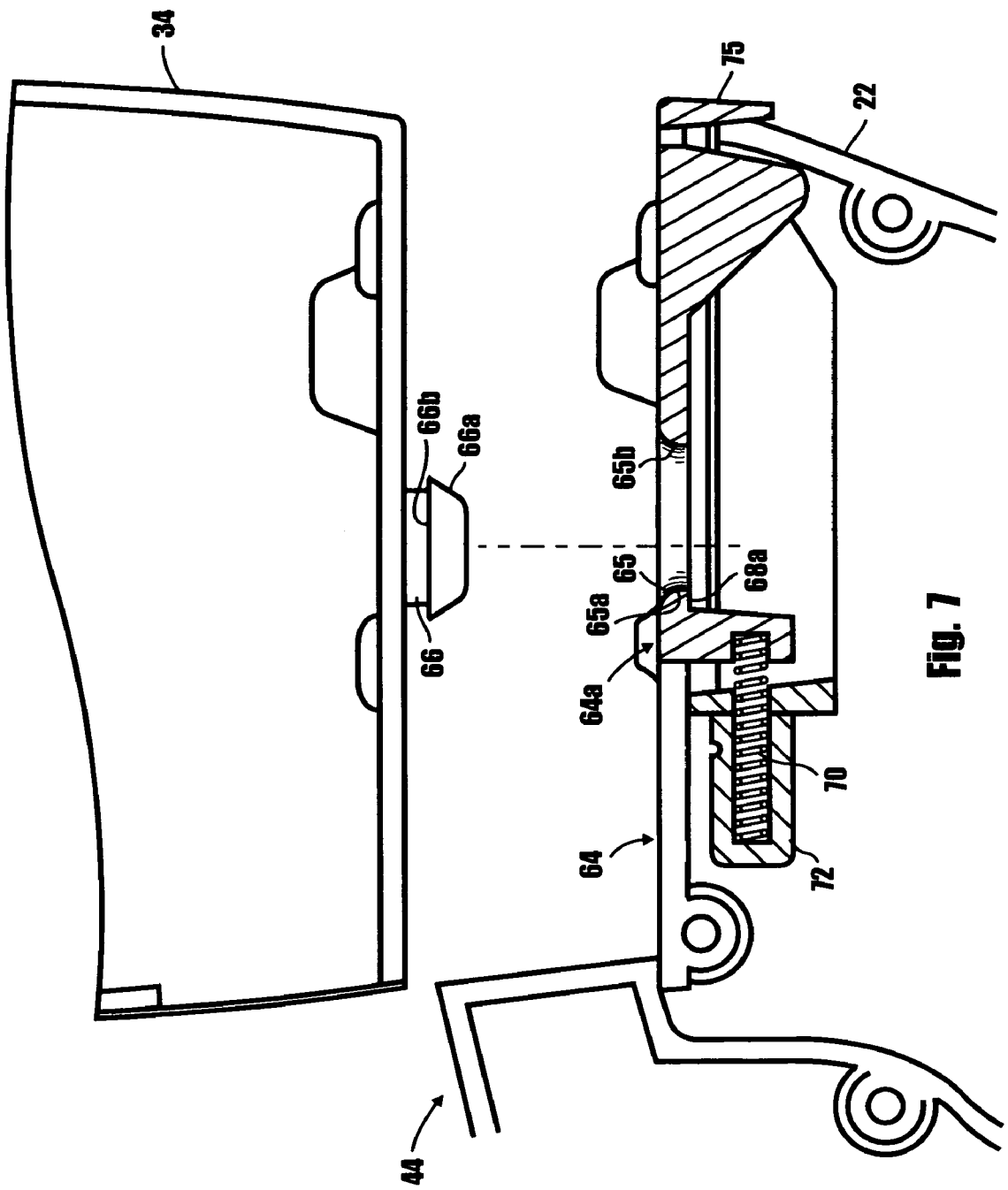
FIG. 7 is a greatly enlarged, cross-sectional view further illustrating the method of interconnection of the material containing cartridge with the upper body of the dispenser apparatus.
Figure 8:
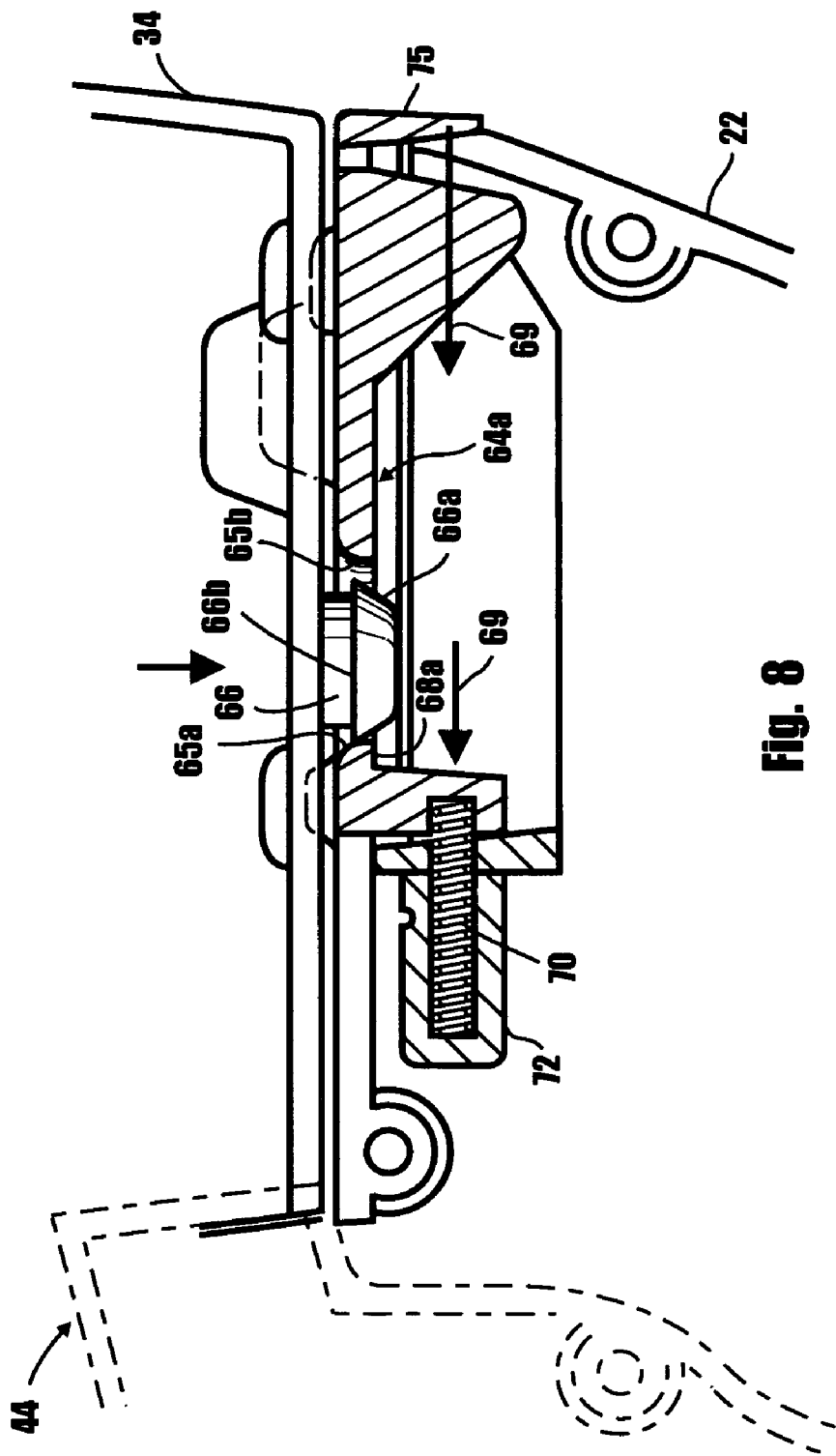
FIG. 8 is a cross-sectional view, similar to FIG. 7, showing the material containing cartridge in position for interconnection with the upper body of the dispenser apparatus.
Figure 9:
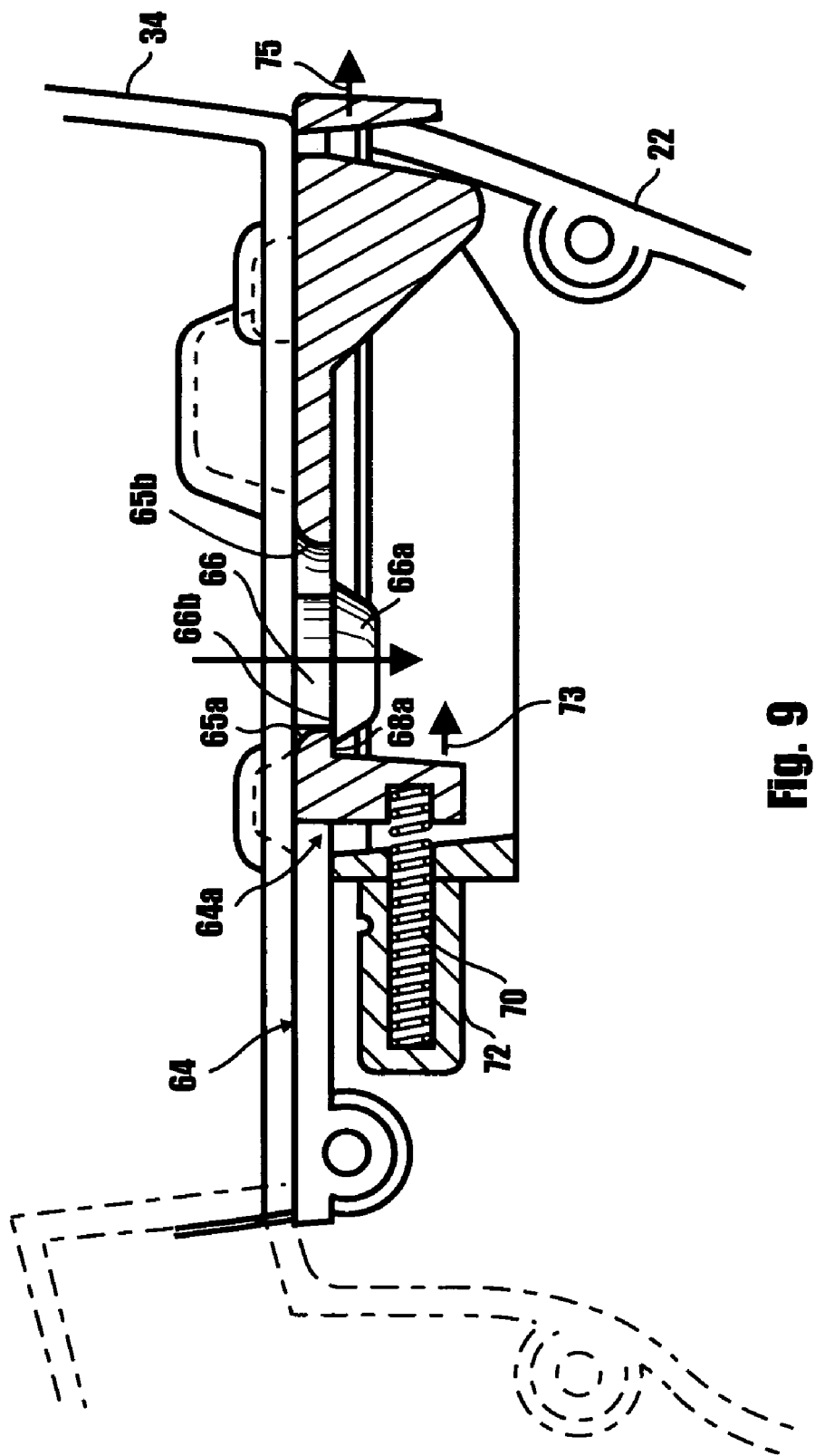
FIG. 9 is a cross-sectional view, similar to FIG. 8, showing the material containing cartridge interconnected with the upper body of the dispenser apparatus.

In using the dispenser apparatus, the powdered material containing cartridge 34 is first removed from the "six pack", or like packaging configuration (not shown), and mated with the housing 22 in the manner illustrated in FIGS. 7, 8 and 9 of the drawings. In this regard, connector means are provided for releasably interconnecting the cartridge 34 with the upper portion 22a of the housing 22. In the present form of the invention this important connector means comprises a locking plate assembly 64 that is interconnected with closure wall 42 of the container (See FIG. 2). As indicated in FIGS. 6 and 7 of the drawings, locking plate assembly 64, which is positioned intermediate the pair of indexing protuberances 26, is provided with an opening 65 for lockably receiving a downwardly extending locking protuberance 66 that is formed on bottom wall 34b of the cartridge 34. More particularly, the locking plate assembly includes a locking slide 64a that is interconnected with locking plate 64 for movement between a first protuberance engaging position shown in FIG. 9 and a second release position. As shown in FIGS. 7, 8 and 9, the locking plate assembly includes a locking slide biasing means, here provided as a coil spring 70, for biasing the locking slide towards the first protuberance engaging position.

As indicated in FIG. 7, locking protuberance 66 is provided with a tapered side wall 66a that is adapted to engage a pair of spaced-apart rounded shoulders 65a and 65b that are provided on locking slide 64a and cooperate to define a protuberance receiving opening 65 (FIG. 7). In the manner indicated in FIG. 8, as the cartridge 34 is lowered into the position, the locking slide is moved in the direction of the arrows 69 of FIG. 8 by locking protuberance 66 acting on the locking slide against the urging of a coil spring 70 that is held in position by a spring retainer 72. A continued downward movement of the cartridge 34 will cause the indexing protuberances 26 to move into the recesses 39 formed in the bottom wall of the cartridge and will cause the locking protuberance 66 to move into the downward position shown in FIG. 9. With the locking protuberance in this position, the spring 72 will urge the latching element to move in the direction of the arrows 73 of FIG. 9 and will cause the latching ear 68a of the latching slide to move into locking engagement with a shoulder 66b formed on locking protuberance 66. In this position, the cartridge 64 is locked in sealing engagement with the upper portion of the housing 22 and the material outlet 35 of the cartridge is aligned with inlet 47a of the dispensing housing 46.

With the formula bottle "B" in position on the support base 28 in the manner illustrated in FIG. 3 and with powdered material containing cartridge 34 interconnected with the housing in the manner described in the preceding paragraph, the user can move the sealing tab 38 upwardly by gripping the upper margin 38a of the sealing tab (see FIG. 3). To dispense a predetermined amount of formula into the formula bottle, the user need only push downwardly on the palm-engaging head portion 51 of the shaft 50. This downward movement of the shaft from the position shown by the phantom lines in FIG. 5A to the position shown by the solid lines in FIG. 5A, will result in an oscillating movement of the powdered material dispensing component 54 within the lower portion of chamber 47, in the manner previously described which will cause the powdered material to flow evenly into the formula bottle.

Additionally, as previously mentioned, the downward movement of the dispensing plunger creates a negative pressure internally of the dispensing chamber of the dispenser so as to assist in the uniform withdrawal of formula from the pre-filled cartridge. More particularly, as shown in FIG. 5B of the drawings, palm-engaging head 51 includes a passageway 51a that communicates with a reduced diameter passageway 50c formed in the upper portion of shaft 50. Passageway 50c, in turn, communicates with a cross-bore 50d formed in the upper portion of the shaft. With this construction, the downward movement of the shaft from the position shown by the phantom lines in FIG. 5A to the position shown by the solid lines in FIG. 5A, will result in a decrease in pressure which assists in drawing the powdered material from the cartridge via outlet 35. However, when the user removes his or her palm from the palm-engaging head portion, passageway 51a will be open to atmosphere permitting pressure equalization to occur via the cross-bore 50d and the reduced diameter passageway 50c.

Following the dispensing step, the bottle can be removed from support 28 and the formula appropriately intermixed with water or other liquid.

When the cartridge 34 is empty, it can be easily disconnected from housing 22 by pushing inwardly on the release tab 75 of the locking slide 64a in a manner to move the latching element into the retracted, or release position against the urging of the spring 70.

Turning next to FIG. 10 of the drawings, an alternate form of the powdered material containing cartridge is there shown and generally designated by the 77. This cartridge is similar in most respects in construction and operation to the previously described cartridge 34. However, in this alternate form of the invention, the top wall 77a of the cartridge is provided with an opening 79 which, upon opening of a cover 80, can be used to refill the cartridge with formula as may be required.

Having now described the invention in detail in accordance with the requirements of the patent statues, those skilled in this art will have no difficulty in making changes and modifications in the individual parts or their relative assembly in order to meet specific requirements or conditions. Such changes and modifications may be made without departing from the scope and spirit of the invention, as set forth in the following claims:

I claim:

1. A dispenser apparatus for dispensing powdered material into a container having an opening therein comprising:
    (a) a housing having a base portion and an upper portion;
    (b) a container support base connected to said housing for supporting the container, said container support base being movable between first and second positions;
    (c) a powdered material containing cartridge removably connected to said upper portion of said housing, said cartridge having an outlet;
    (d) a powdered material dispensing assembly connected to said upper portion of said housing, said powdered material dispensing assembly including:
        (i) a dispensing housing having a powdered material chamber, said dispensing housing having an inlet in communication with said cartridge outlet and an outlet in communication with the opening in the container; and
        (ii) a material dispensing plunger sub-assembly interconnected with said dispensing housing, said plunger sub-assembly comprising:

a. an elongated shaft movable within said powdered material holding chamber between first and second positions, said elongated shaft having an upper portion and a lower portion;
b. a powdered material dispensing component connected to said lower portion of said elongated shaft for dispensing metered amounts of powdered material into the container; and
c. oscillating means connected to said upper portion of said housing for oscillating said powdered material dispensing component within said powdered material holding chamber.

2. The dispenser apparatus as defined in claim 1 in which said oscillating means comprises:
   (a) a collar affixed to said elongated shaft proximate said upper portion thereof, said collar having a pair of oppositely disposed guide pins extending therefrom;
   (b) a coil spring circumscribing said elongated shaft and disposed between said collar and said powdered material dispensing component; and
   (c) a pair of oppositely disposed guide members connected to said upper portion of said housing, each of said guide members having a generally serpentine-shaped guide channel for closely receiving said guide pins to impart an oscillating motion to said powdered material dispensing component as said elongated shaft moves towards said second position.

3. The dispenser apparatus as defined in claim 1, further including a container support base connected to said housing for supporting the container, said container support base being movable relative to said housing between first and second positions.

4. The dispenser apparatus as defined in claim 1 in which said powdered material dispensing component comprises an upper wall, a lower wall and a plurality of angularly extending material dispensing walls disposed between said upper wall and said lower wall.

5. The dispenser apparatus as defined in claim 1, further including container support base biasing means for biasing said container support base toward said first position.

6. The dispenser apparatus as defined in claim 1, further including connector means for releasably interconnecting said powdered material containing cartridge with said upper portion of said housing.

7. The dispenser apparatus as defined in claim 6 in which said powdered material containing cartridge includes a downwardly extending locking member and in which said connector means comprises a locking plate connected to said upper portion of said housing, said locking plate having an opening for lockably receiving said downwardly extending locking member.

8. A dispenser apparatus for dispensing powdered material into a container having an opening therein comprising:
   (a) a housing having a base portion and an upper portion;
   (b) a container support base connected to said housing for supporting the container, said container support base being movable between first and second positions;
   (c) a powdered material containing cartridge removably connected to said upper portion of said housing, said cartridge having an outlet;
   (d) a powdered material dispensing assembly connected to said upper portion of said housing, said powdered material dispensing assembly including:
      (i) a dispensing housing having a powdered material chamber, said dispensing housing having an inlet in communication with said cartridge outlet and an outlet in communication with the opening in the container; and
      (ii) a material dispensing plunger sub-assembly interconnected with said dispensing housing, said plunger sub-assembly comprising:
         a. an elongated shaft movable within said powdered material holding chamber between first and second positions, said elongated shaft having an upper portion and a lower portion;
         b. a powdered material dispensing component connected to said lower portion of said elongated shaft for dispensing metered amounts of powdered material into the container;
         c. a collar affixed to said elongated shaft proximate said upper portion thereof, said collar having a pair of oppositely disposed guide pins extending therefrom;
         d. a coil spring circumscribing said elongated shaft and disposed between said collar and said powdered material dispensing component; and
         e. a pair of oppositely disposed guide members connected to said upper portion of said housing, each of said guide members having a generally serpentine-shaped guide channel for closely receiving said guide pins to impart an oscillating motion to said powdered material dispensing component as said elongated shaft moves towards said second position.

9. The dispenser apparatus as defined in claim 8 in which said powdered material dispensing component comprises an upper wall, a lower wall and a plurality of angularly extending material dispensing walls disposed between said upper wall and said lower wall.

10. The dispenser apparatus as defined in claim 8, further including a container support base biasing means for biasing said container support base toward said first position.

11. The dispenser apparatus as defined in claim 8, in which said powdered material containing cartridge further includes a sealing tab slidably connected to said powdered material containing cartridge, said sealing tab being movable from a first outlet closure position to a second open position.

12. The dispenser apparatus as defined in claim 8, further including connector means for releasably interconnecting said powdered material containing cartridge with said upper portion of said housing.

13. The dispenser apparatus as defined in claim 12 in which said powdered material containing cartridge includes a downwardly extending locking protuberance and in which said connector means comprises a locking plate assembly connected to said upper portion of said housing, said locking plate assembly including a locking plate having an opening for lockably receiving said downwardly extending locking member.

14. The dispenser apparatus as defined in claim 13 and which said locking plate assembly further includes a locking slide interconnected with said locking plate for movement between a first protuberance engaging position and a second release position.

15. The dispenser apparatus as defined in claim 14 in which said locking plate assembly further includes a locking slide biasing means for biasing said locking slide towards said first protuberance engaging position.

16. A dispenser apparatus for dispensing powdered material into a container having an opening therein comprising:

(a) a housing having a base portion and an upper portion, said upper portion including a closure wall having a pair of spaced-apart, upwardly extending indexing protuberances;
(b) a container support base connected to said housing for supporting the container, said container support base being movable between first and second positions;
(c) a container support base biasing means connected to said container support base for biasing said container support base toward said first position;
(d) a powdered material containing cartridge removably connected to said upper portion of said housing, said cartridge including:
  (i) a side wall having an outlet and a sealing tab slidably connected to said side wall of said powdered material containing cartridge for movement between a first outlet closure position to a second open position; and
  (ii) a bottom wall having a pair of spaced-apart recesses constructed and arranged to receive said indexing protuberances formed on said closure wall of said housing;
(e) connector means connected to said upper portion of said housing for releasably interconnecting said powdered material containing cartridge with said upper portion of said housing;
(f) a powdered material dispensing assembly connected to said upper portion of said housing, said powdered material dispensing assembly including:
  (i) a dispensing housing having a powdered material chamber, said dispensing housing having an inlet in communication with said cartridge outlet and an outlet in communication with the opening in the container; and
  (ii) a material dispensing plunger sub-assembly interconnected with said dispensing housing, said plunger sub-assembly comprising:
    a. an elongated shaft movable within said powdered material holding chamber between first and second positions, said elongated shaft having an upper portion and a lower portion;
    b. a powdered material dispensing component connected to said lower portion of said elongated shaft for dispensing metered amounts of powdered material into the container;
    c. a collar affixed to said elongated shaft proximate said upper portion thereof, said collar having a pair of oppositely disposed guide pins extending therefrom;
    d. a coil spring circumscribing said elongated shaft and disposed between said collar and said powdered material dispensing component; and
    e. a pair of oppositely disposed guide members connected to said upper portion of said housing, each of said guide members having a generally serpentine-shaped guide channel for closely receiving said guide pins to impart an oscillating motion to said powdered material dispensing component as said elongated shaft moves towards said second position.

17. The dispenser apparatus as defined in claim 16 in which said connector means comprises a locking plate assembly connected to said upper portion of said housing, said locking plate assembly including a locking plate having an opening for lockably receiving said downwardly extending locking member.

18. The dispenser apparatus as defined in claim 17 and which said locking plate assembly further includes a locking slide interconnected with said locking plate for movement between a first protuberance engaging position and a second release position.

19. The dispenser apparatus as defined in claim 18 in which said locking plate assembly further includes a locking slide biasing means for biasing said locking slide towards said first protuberance engaging position.

20. The dispenser apparatus as defined in claim 18 in which said powdered material containing cartridge includes an inlet opening for introducing powdered material into said cartridge.

* * * * *